United States Patent
High et al.

(10) Patent No.: US 11,869,111 B2
(45) Date of Patent: *Jan. 9, 2024

(54) SYSTEMS AND METHODS FOR DELIVERING MERCHANDISE USING AUTONOMOUS GROUND VEHICLES AND UNMANNED AERIAL VEHICLES

(71) Applicant: Walmart Apollo, LLC, Bentonville, AR (US)

(72) Inventors: Donald R. High, Noel, MO (US); Noah R. Kapner, Noel, MO (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,268

(22) Filed: Dec. 29, 2022

(65) Prior Publication Data
US 2023/0153935 A1    May 18, 2023

Related U.S. Application Data

(63) Continuation of application No. 17/480,595, filed on Sep. 21, 2021, now Pat. No. 11,568,508, which is a
(Continued)

(51) Int. Cl.
*G06Q 50/28* (2012.01)
*G05D 1/00* (2006.01)
(Continued)

(52) U.S. Cl.
CPC .......... *G06Q 50/28* (2013.01); *B64C 39/024* (2013.01); *G05D 1/0027* (2013.01);
(Continued)

(58) Field of Classification Search
CPC .... G06Q 50/28; B64C 39/024; G05D 1/0027; G05D 1/0088; G05D 1/0212; B64U 2101/60
(Continued)

(56) References Cited

U.S. PATENT DOCUMENTS 9,256,852 B1  2/2016  Myllymaki
9,373,262 B2  6/2016  Stigler
(Continued)

FOREIGN PATENT DOCUMENTS

WO    2018194878    10/2018

OTHER PUBLICATIONS

PCT; App. No. PCT/US2018/026800; International Search Report and Written Opinion dated Jun. 27, 2018.
(Continued)

*Primary Examiner* — Isaac G Smith
(74) *Attorney, Agent, or Firm* — Fitch, Even, Tabin & Flannery LLP

(57) ABSTRACT

In some embodiments, apparatuses and methods are provided herein useful to delivering merchandise using autonomous ground vehicles (AGVs) in cooperation with unmanned aerial vehicles (UAVs). In some embodiments, the system includes: an AGV having a motorized locomotion system, a storage area to hold merchandise, a sensor to detect obstacles, a transceiver, and a control circuit to operate the AGV; a UAV having a motorized flight system, a gripper mechanism to grab merchandise, a transceiver, an optical sensor to capture images; and a control circuit to operate the UAV. In some forms, the system may include a control circuit that instructs movement of the AGV along a delivery route; determines if the AGV has stopped due to an obstacle; and in certain circumstances, instructs the UAV to retrieve merchandise from the AGV, calculates a delivery
(Continued)

route for the UAV to the delivery location, and instructs the UAV to deliver the merchandise.

20 Claims, 4 Drawing Sheets

Related U.S. Application Data continuation of application No. 15/946,167, filed on Apr. 5, 2018, now abandoned.

(60) Provisional application No. 62/486,060, filed on Apr. 17, 2017.

(51) Int. Cl.
*B64C 39/02* (2023.01)
*G05D 1/02* (2020.01)
*B64D 1/22* (2006.01)
*G01C 21/34* (2006.01)
*B64U 80/86* (2023.01)
*B64U 101/30* (2023.01)
*B64U 101/60* (2023.01)

(52) U.S. Cl.
CPC ......... *G05D 1/0088* (2013.01); *G05D 1/0212* (2013.01); *B64D 1/22* (2013.01); *B64U 80/86* (2023.01); *B64U 2101/30* (2023.01); *B64U 2101/60* (2023.01); *B64U 2201/20* (2023.01); *G01C 21/3415* (2013.01)

(58) Field of Classification Search
USPC .......................................................... 701/2
See application file for complete search history.

(56) References Cited

U.S. PATENT DOCUMENTS

| | | | |
|---|---|---|---|
| 9,457,915 B2 | 10/2016 | Wang | |
| 9,469,394 B2 | 10/2016 | Vaughn | |
| 9,550,577 B1 | 1/2017 | Beckman | |
| 9,573,684 B2 | 2/2017 | Kimchi | |
| 9,792,576 B1 * | 10/2017 | Jamjoom | G05D 1/104 |
| 9,969,494 B1 * | 5/2018 | Buchmueller | B64D 1/12 |
| 10,303,171 B1 * | 5/2019 | Brady | G05D 1/0278 |
| 11,568,508 B2 | 1/2023 | High | |
| 2015/0006005 A1 | 1/2015 | Yu | |
| 2015/0102154 A1 | 4/2015 | Duncan | |
| 2015/0277440 A1 | 10/2015 | Kimchi | |
| 2016/0185466 A1 | 6/2016 | Dreano | |
| 2016/0196755 A1 | 7/2016 | Navot | |
| 2016/0196756 A1 | 7/2016 | Prakash | |
| 2016/0200437 A1 | 7/2016 | Ryan | |
| 2016/0200438 A1 | 7/2016 | Bokeno | |
| 2016/0257401 A1 | 9/2016 | Buchmueller | |
| 2016/0280460 A1 | 9/2016 | Porat | |
| 2017/0043871 A1 | 2/2017 | Takayama | |
| 2017/0090484 A1 | 3/2017 | Obaidi | |
| 2017/0110017 A1 | 4/2017 | Kimchi | |
| 2018/0285806 A1 | 10/2018 | Scofield | |
| 2018/0300834 A1 | 10/2018 | High | |
| 2022/0207639 A1 | 6/2022 | High | |

OTHER PUBLICATIONS

Mathew, Neil et al.; "Optimal Path Planning in Cooperative Heterogeneous Multi-robot Delivery Systems"; University of Waterloo; published Apr. 2015; pp. 1-16.
Kolodny, Lora; "Mercedes-Benz and Matternet unveil vans that launch delivery drones"; https://techcrunch.com/2016/09/07/mercedesbenzandmatternetunveilvansthatlaunchdeliverydrones/; published Sep. 7, 2016; pp. 1-7.
"Automating The Last Mile: Startups Working on Autonomous Drone Delivery by Air and Land"; https://www.cbinsights.com/blog/earlystageautonomousdronestartups/; published Sep. 8, 2016; pp. 1-3.
Workhorse; "HorseFly"; http://workhorse.com/aerospace; Feb. 2017; pp. 1-6.
Workhourse Group; "UPS Tests Residential Delivery via Drone"; https://www.youtube.com/watch?v=HEkHhZDuLhU&feature=youtu.be&list=PL5-b6iGIXM9Gj2O5yKVLaO7ur3KJkyBvS; published Feb. 21, 2017; pp. 1-5.
Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; published Dec. 9, 2015; pp. 1-3.
USPTO; U.S. Appl. No. 15/946,167; Office Action dated Aug. 19, 2020, (pp. 1-41).
USPTO; U.S. Appl. No. 15/946,167; Office Action dated Feb. 17, 2021; (pp. 1-64).
USPTO; U.S. Appl. No. 15/946,167; Notice of Allowance dated Jun. 24, 2021; (pp. 1-10).
USPTO; U.S. Appl. No. 17/480,595; Notice of Allowance and Fees Due (PTOL-85) dated Sep. 28, 2022; (pp. 1-10).

* cited by examiner

SYSTEMS AND METHODS FOR DELIVERING MERCHANDISE USING AUTONOMOUS GROUND VEHICLES AND UNMANNED AERIAL VEHICLES

CROSS-REFERENCE TO RELATED APPLICATIONS

This application is a continuation application of U.S. application Ser. No. 17/480,595 filed Sep. 21, 2021, which is a continuation application of U.S. application Ser. No. 15/946,167, filed Apr. 5, 2018, which claims priority to, and the benefit of, U.S. Provisional Application No. 62/486,060, filed Apr. 17, 2017, the contents of all of which are incorporated herein by reference in their entirety.

TECHNICAL FIELD

This invention relates generally to the delivery of merchandise, and more particularly, to the delivery of merchandise using autonomous ground vehicles and unmanned aerial vehicles.

BACKGROUND

In the retail setting, one important challenge is the delivery of merchandise to customers. Frequently, customers will order merchandise for delivery to their residence or other delivery location within a certain scheduled time. Various delivery methods are available, including the use of a retailer's delivery vehicles and third party delivery services. Recently, efforts have been made to employ autonomous ground vehicles to complete deliveries to customers.

The use of autonomous ground vehicles, however, presents its own challenges. More specifically, autonomous ground vehicles will often encounter obstacles that may prevent them from completing the delivery, such as, for example, motor vehicles, people, animals, road construction, curbs, and closed gates. If the autonomous ground vehicle is unable to complete a delivery due to an obstacle, it is desirable to have a back-up mechanism available to complete the delivery.

BRIEF DESCRIPTION OF THE DRAWINGS

Disclosed herein are embodiments of systems, apparatuses and methods pertaining to delivering merchandise using autonomous ground vehicles in cooperation with unmanned aerial vehicles. This description includes drawings, wherein.

Figure 1A:
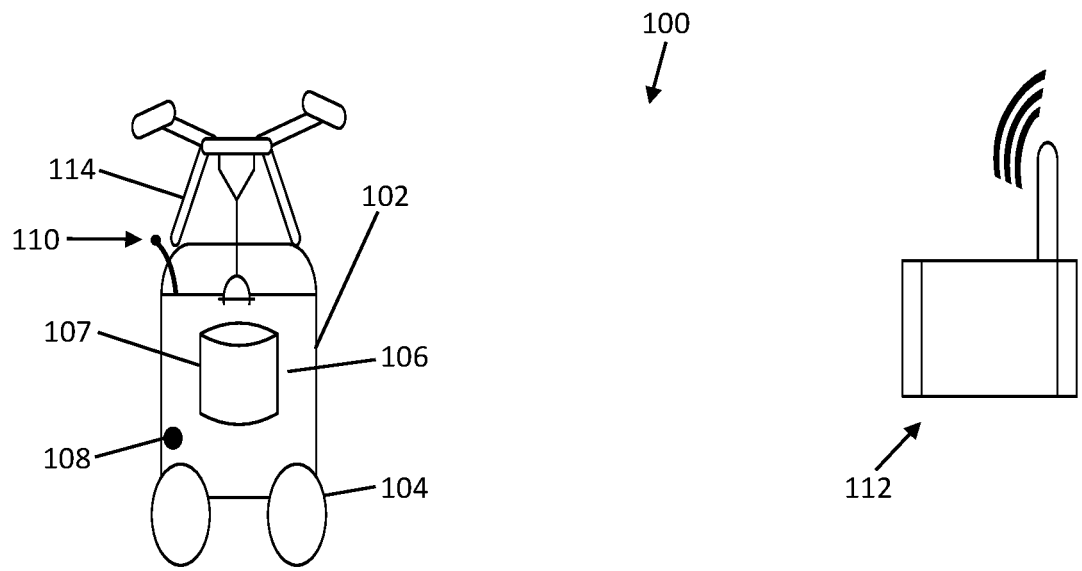
FIGS. 1A and 1B are schematic diagrams in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to delivering merchandise using autonomous ground vehicles in cooperation with unmanned aerial vehicles. In some embodiments, there is provided a system including: an autonomous ground vehicle (AGV) including: a motorized locomotion system configured to facilitate movement of the AGV; a storage area configured to hold at least one merchandise item; at least one sensor configured to detect obstacles in a direction of travel of the AGV and to stop the AGV if the at least one sensor detects an obstacle in the direction of travel; a first transceiver configured for wireless communication; a first control circuit operatively coupled to the motorized locomotion system, the at least one sensor, and the first transceiver, the first control circuit configured to operate and move the AGV; an unmanned aerial vehicle (UAV) including: a motorized flight system configured to facilitate flight of the UAV; a gripper mechanism configured to selectively grasp, hold, and release a merchandise item; a second transceiver configured for wireless communication; an optical sensor configured to capture a plurality of images; and a second control circuit operatively coupled to the motorized flight system, the gripper mechanism, the second transceiver, and the optical sensor, the second control circuit configured to operate and fly the UAV; and a third control circuit configured to: instruct movement of the AGV along a first delivery route from a starting location to a delivery location; determine if the AGV has stopped based on the detection of an obstacle by the at least one sensor; and if the AGV stop satisfies a predetermined condition: instruct the UAV to retrieve a merchandise item to be delivered from the storage area of the AGV using the gripper mechanism; calculate a second delivery route for the UAV from the stopped AGV location to the delivery location; and instruct the UAV to deliver the merchandise item to be delivered from the AGV's stopped location to the delivery location using the optical sensor to capture images of the delivery location.

In one form, in the system, the third control circuit may be configured to: calculate a third delivery route to the delivery location from the AGV's stopped location if the AGV encounters an obstacle and the stop does not satisfy the predetermined condition; and instruct the AGV to move along the third delivery route to the delivery location to complete the delivery. Further, in the system, the predetermined condition may include completing the delivery within a predetermined delivery time; the third control circuit may be unable to calculate a third delivery route for the AGV in which the delivery is completed within the predetermined delivery time such that the predetermined condition is not satisfied; and the third control circuit may instruct the UAV to complete the delivery. In addition, in the system, the predetermined condition may include a predetermined maximum wait time interval such that the UAV is instructed to retrieve the merchandise item to be delivered if an obstacle causes the AGV to be stopped for a length of time exceeding the predetermined maximum wait time interval.

In one form, the system may further include a mounting area on the AGV configured to support a UAV on the AGV and to secure it during movement of the AGV. Further, in the system, the third control circuit may be configured to instruct the UAV to return to the mounting area on the AGV following completion of the delivery by the UAV, the UAV using its optical sensor to return to the mounting area. In addition, the third control circuit may be physically located at a command and control center remote from the AGV and the UAV, the third control circuit in wireless communication with the first and second control circuits. Also, in the system, the third control circuit may define a unitary control circuit with either the first or second control circuits such that the third control circuit is physically incorporated into either the AGV or UAV.

In one form, in the system, the at least one sensor may include at least one of laser, ultrasound, optical, and infrared sensors. Further, the obstacles in the direction of travel of the AGV may include at least one of motor vehicles, people, animals, road construction, curbs, and closed gates. In addition, in the system, the AGV and UAV may each further include a GPS tracking device, and the third control circuit may be configured to track the locations of the AGV and the UAV.

In another form, there is provided a method for delivery of merchandise using autonomous ground vehicles in cooperation with unmanned aerial vehicles, the system including: providing an autonomous ground vehicle (AGV) including: a motorized locomotion system configured to facilitate movement of the AGV; a storage area configured to hold at least one merchandise item; at least one sensor configured to detect obstacles in a direction of travel of the AGV and to stop the AGV if the at least one sensor detects an obstacle in the direction of travel; a first transceiver configured for wireless communication; and a first control circuit operatively coupled to the motorized locomotion system, the at least one sensor, and the first transceiver, the first control circuit configured to operate and move the AGV; providing an unmanned aerial vehicle (UAV) including: a motorized flight system configured to facilitate flight of the UAV; a gripper mechanism configured to selectively grasp, hold, and release a merchandise item; a second transceiver configured for wireless communication; an optical sensor configured to capture a plurality of images; and a second control circuit operatively coupled to the motorized flight system, the gripper mechanism, the second transceiver, and the optical sensor, the second control circuit configured to operate and fly the UAV; instructing movement of the AGV along a first delivery route from a starting location to a delivery location; determining if the AGV has stopped based on the detection of an obstacle by the at least one sensor; and if the AGV stop satisfies a predetermined condition: instructing the UAV to retrieve a merchandise item to be delivered from the storage area of the AGV using the gripper mechanism; calculating a second delivery route for the UAV from the stopped AGV location to the delivery location; and instructing the UAV to deliver the merchandise item to be delivered from the AGV's stopped location to the delivery location using the optical sensor to capture images of the delivery location.

Figure 1B:
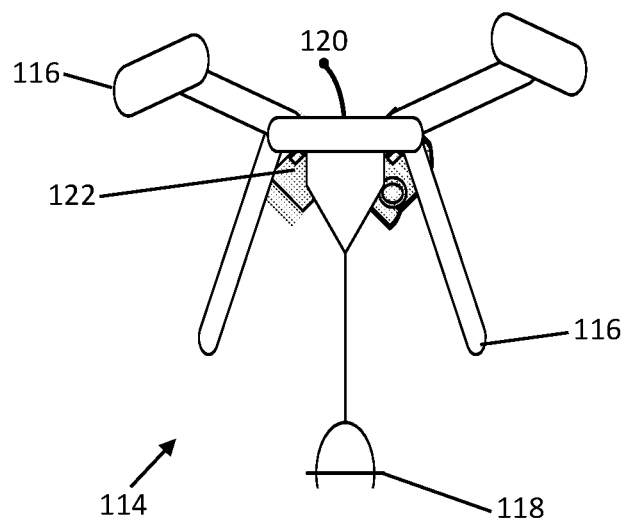

Referring to FIGS. 1A and 1B, there is shown a schematic representation of a delivery system 100 using an AGV as a primary delivery mechanism and a UAV as a backup if an obstacle blocks the AGV. In other words, the delivery system generally involves cooperation of an AGV and a UAV. In many circumstances, it is contemplated that an AGV will be able to make the delivery itself without assistance. However, in some circumstances, the AGV may encounter an obstacle that it cannot easily avoid or circumvent. In such circumstances, it is contemplated that a UAV will complete the delivery by retrieving the merchandise from the AGV and transporting it to the delivery location.

As a simple example, in some circumstances, the AGV may be able to travel most of the delivery route but cannot complete the last leg, i.e., the last 50 feet to the delivery location. For example, the AGV might get struck at the gate in front of a customer's residence. So, the AGV could travel all the way to the gate, and the UAV can then grab the package and deliver it to the residence.

The system 100 includes an AGV 102 configured to deliver merchandise by travelling from a starting location to a delivery location. It is generally contemplated that the AGV will deliver merchandise from a retailer to a delivery location (such as the customer's residence). The AGV 102 may travel from a starting location at a retail store, a delivery vehicle (that may transport multiple AGVs 102 to certain locations), a product distribution center, or any other suitable location. The AGV 102 may then travel along a delivery route to a delivery location, such as a customer residence, customer business location, or other customer designated pick up location.

It is generally contemplated that the AGV 102 includes certain conventional components that allow it to transport merchandise 107. For example, the AGV 102 includes a motorized locomotion system 104 configured to facilitate movement of the AGV 102. In one form, it is generally contemplated that this motorized locomotion system 104 includes wheels, a motor, a drive mechanism coupled to the wheels, and a power source to enable operation of the wheels and drive mechanism. Further, the AGV 102 includes a storage area 106 configured to hold at least one package/merchandise item 107. As should be evident, the storage area 106 may be any of various physical sizes and geometries, and the AGV 102 may be configured to make one delivery at a time before picking up an additional merchandise item 107 or may make multiple deliveries of merchandise items 107 before replenishing its storage area 106.

The AGV 102 also includes sensor(s) 108 configured to detect obstacles in a direction of travel of the AGV 102 and to stop the AGV 102 if obstacles are detected. For example, some types of obstacle detection sensors may include laser, ultrasound, optical, and infrared sensors, although any suitable obstacle detection sensor may be used. Further, some examples of types of obstacles the AGV 102 may encounter include motor vehicles, people, animals, road construction, curbs, closed gates, and any unpredictable obstructions, but these examples are not intended to encompass an exhaustive list of possible obstacles.

In addition, the AGV 102 includes a transceiver 110 for wireless communication. In one form, as addressed further below, it is contemplated that the AGV 102 may communicate with a command and control center 112 remote from the AGV 102. It is also contemplated that the AGV 102 may communicate with a UAV 114 as an alternative to (or in addition to) communicating with the command and control center 112.

As shown in FIG. 1, the system 100 also includes UAV 114 configured to deliver merchandise 107 by travelling from the AGV 102 to the delivery location. As stated above, the UAV 114 operates as a back-up delivery mechanism in the event that the AGV 102 encounters an obstacle that prevents the AGV 102 from completing the delivery. In one form, the UAV 114 may be mounted on and transported by the AGV 102 during the delivery. In another form, it is contemplated that the AGV 102 may communicate when it encounters an obstacle, and the UAV 114 may travel to the AGV 102 to pick up the merchandise 107 to be delivered and to then fly to the delivery location to complete the delivery.

It is generally contemplated that the UAV 114 includes certain conventional components that allow it to transport merchandise 107. For example, the UAV 114 includes a motorized flight system 116 configured to facilitate flight of the UAV 114. In one form, it is generally contemplated that this motorized flight system 116 includes props, a navigational guidance system coupled to the props, a power source to enable operation of the props and navigational guidance system, and landing gear. Further, the UAV 114 includes a gripper mechanism 118 configured to selectively grasp, hold, and release a merchandise item 107. This gripper mechanism 118 may be any of various types, such as grabber claws, magnetic devices, etc., as may be suitable to retrieve a merchandise item 107, hold it during transport, and then release it at the delivery location. The UAV 114 also includes a transceiver 120 configured for wireless communication, such as for communication with the AGV 102 and/or with command and control center 112.

Further, the UAV 114 includes an optical (or imaging) sensor 122 configured to capture a plurality of images. The optical sensor 122 may be any of various types of cameras, video devices, etc., that may be configured to capture still images and/or image sequences. In one form, it is contemplated that these images may be transmitted to the command and control center 112 to enable a pilot to navigate the UAV 114 in certain circumstances. For example, images may be captured of the AGV storage area 106 to allow a pilot operating the UAV 114 to grab the merchandise item 107. As another example, the optical sensor 122 may capture images of the landing area about the delivery location to allow a pilot to choose a suitable landing area and land the drone. Further, the optical sensor 122 may capture images of an area on the AGV 102 for mounting the UAV 114, thereby allowing a pilot to land the UAV 114 in this area following completion of a delivery.

Figure 2:
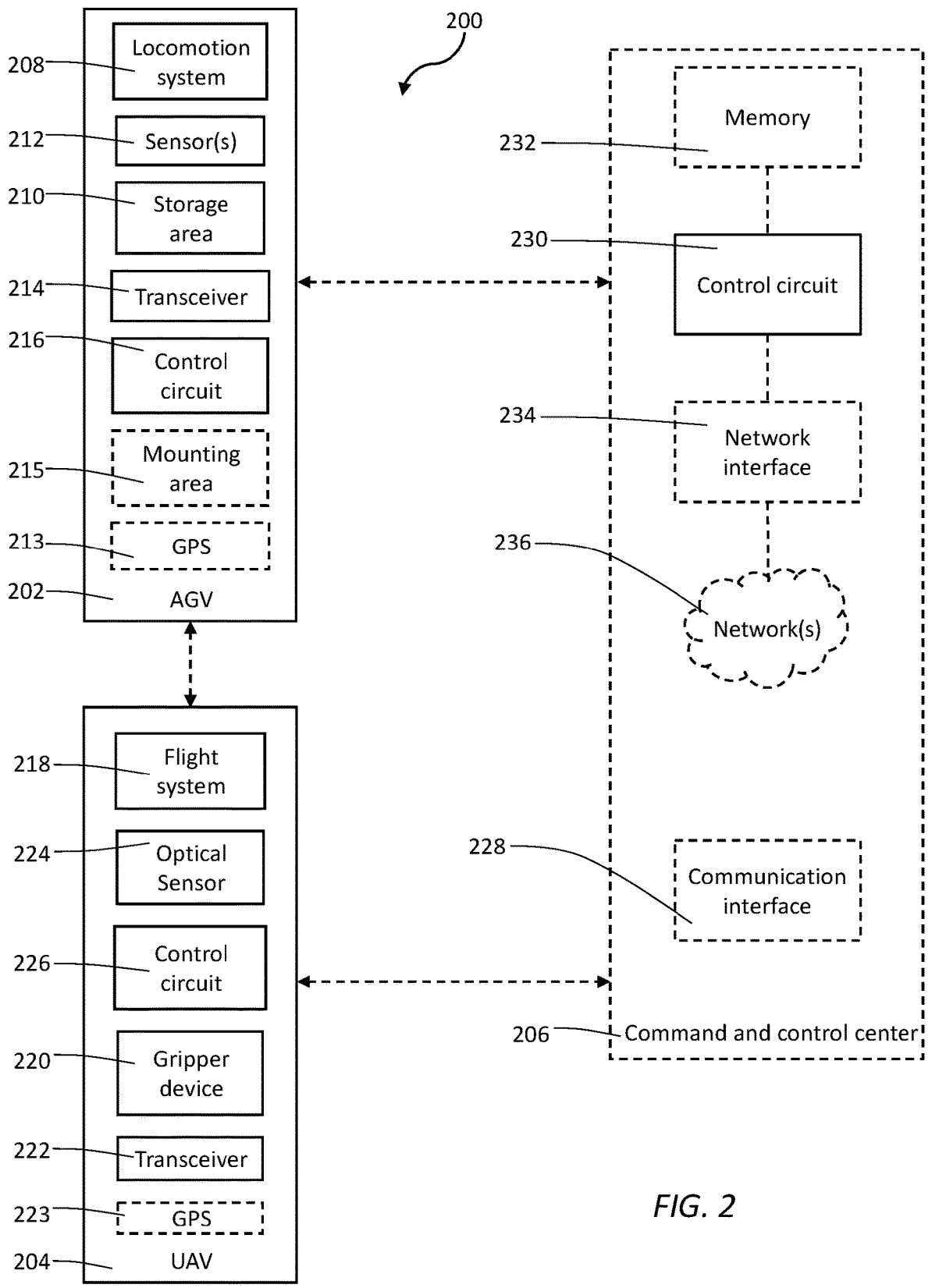
FIG. 2 is a block diagram in accordance with some embodiments.

Referring to FIG. 2, there is shown a system 200 for the delivery of merchandise, such as from a retailer to a customer. The system 200 includes an AGV 202 and a UAV 204 that cooperate with one another to complete the delivery. In some circumstances, the AGV 202 may be able to transport merchandise along a delivery path to a destination without any action required from the UAV 204. In other words, the UAV 204 operates as the primary delivery mechanism. However, in some circumstances, the AGV 202 may encounter an obstacle that prevents it from completing delivery. In these circumstances, it is contemplated that the UAV 204 will complete the delivery to the destination by flying over any obstacles, i.e., it will operate as a secondary delivery mechanism, if necessary. As described further below, the system 200 may include a remote command and control center 206 that controls, in whole or in part, the operation of the AGV 202 and/or the UAV 204.

The AGV 202 includes various components in order to deliver merchandise from a starting location (such as a retailer's store, product distribution center, etc.) to a destination location (such as a customer residence or business location). The AGV 202 includes a conventional motorized locomotion system 208 for facilitating movement of the AGV 202. It is generally contemplated that the motorized locomotion system 208 may include wheels (or tracks or legs), a motor, a drive mechanism, and a power source (such as a battery). In one form, the motorized locomotion system 208 may be navigated along a preprogrammed or calculated delivery route from the starting location to the destination location (or to a waypoint near the destination location). Further, in one form, the motorized locomotion system 208 may be navigated by a human operator at the remote command and control center 206 as it nears the destination (such as from a waypoint near the destination to the final destination location) because more expert navigation may be required at this stage.

The AGV 202 also includes a storage area 210 for holding the merchandise item(s) being delivered. The merchandise items may be of any type suitable for delivery, such as, for example, clothing, grocery, sporting goods, general retail merchandise, etc. In addition, the storage area 210 may be refrigerated and/or insulated for the delivery of perishable items, such as frozen or refrigerated grocery items. Also, the storage area 210 may be of any of various sizes and shapes. It may be relatively small for delivery of a single item per delivery and/or to conserve battery power. Alternatively, it may be relatively large to allow the storage of multiple merchandise items for delivery to different destinations.

The AGV 202 further includes sensor(s) 212 for navigation and for detecting obstacles in the AGV's path as it travels along its delivery route and to permit the AGV 202 to stop if the sensor(s) detect an obstacle in the AGV's path. These sensor(s) 212 may be of any of various types, including compasses and other navigational aids, gyroscopes, laser range finders, ultrasound range finders, infrared sensors, and optical/imaging sensors (such as video/camera devices). It is generally contemplated that the AGV 202 includes sensor(s) 212 that allow the AGV 202 to automatically stop when encountering an obstacle. Some types of obstacles may include motor vehicles, people, animals, road construction, curbs, closed gates, and any unpredictable obstructions. It is also generally contemplated that the AGV 202 may include optical/imaging sensors 212 to permit a human operator to remotely guide the AGV 202 at the end of the delivery to its final merchandise drop-off location.

In addition, the AGV 202 includes a transceiver 214 or other suitable communication device for wireless communication. It is generally contemplated that the AGV 202 will communicate with the UAV 204 and/or with the command and control center 206. For example, when the AGV 202 encounters an obstacle that prevents it from completing the delivery, it may communicate with the UAV 204 to retrieve the merchandise to be delivered and to complete the delivery. Alternatively, the AGV 202 may communicate with the command and control center 206 when it encounters an obstacle (and the center 206 may then communicate with the UAV 204), and/or the AGV 202 may communicate with the command and control center 206 at other times during delivery (such as upon completion of the delivery). Further, the AGV 202 may include a GPS tracking device 213, such as for tracking of the location of the AGV 202 by the command and control center 206.

The AGV 202 may also include a mounting area 215 so that a UAV 204 may be transported along with the AGV 202 during delivery. In other words, the AGV 202 may include a mounting area 215 for supporting the UAV 204 on the AGV 202 and to preferably secure it during movement of the AGV 202. So, in one form, it is contemplated that the UAV 204 may be transported with the AGV 202 during deliveries and, when an obstacle is encountered, the UAV 204 may complete transportation of a merchandise item from the stopped AGV 202 to the destination location. In this form, the UAV 204 may recharge on the AGV 202 before and/or after completing a delivery. However, in another form, it is contemplated that the UAV 204 is not mounted on the AGV 202 but may instead be called from a remote location, as necessary. In other words, if the AGV 202 encounters an obstacle, a UAV 204 may be contacted (either directly by the AGV 202 or by a command and control center 206) and will travel to the stopped AGV to retrieve the merchandise item and complete the delivery.

The system 200 also includes a control circuit 216 that is operatively coupled to the motorized locomotion system 208, the sensor(s) 212, and the transceiver 214, and the control circuit 216 is configured to generally operate the AGV 202. Being a "circuit," the control circuit 216 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 216 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 216 is configured (for example, by using corresponding programming as will be well understood by those skilled in the art) to carry out one or more of the steps, actions, and/or functions described herein.

It is generally contemplated that the control circuit 216 will autonomously navigate and operate the AGV 202 (but possibly with instruction from a remote command and control center 206 in certain circumstances). In one form, the control circuit 216 uses input from the sensor(s) 212 to detect obstacles and to calculate and navigate a delivery route (and to recalculate and determine alternative delivery routes). As described further below, the control circuit 216 uses algorithms to determine the action to be taken when it encounters obstacles and other events during delivery. It is also contemplated that the control circuit 216 may employ artificial intelligence and machine learning capability such that it learns how to deal with events and obstacles as it encounters them during repeated delivery missions. For example, the control circuit 216 may use various inputs and factors with machine learning to develop predictions of the actions to take in view of obstacles. Machine learning algorithms may take into account inputs that can be used to retrain the model to adapt to different obstacles and other inputs that it might encounter along a delivery route.

By one optional approach, the control circuit 216 may be operably coupled to a memory that can serve, for example, to non-transitorily store the computer instructions that, when executed by the control circuit 216, cause the control circuit 216 to behave as described herein. In one form, the control circuit 216 may also operably couple to a network interface that can compatibly communicate via whatever network or networks may be appropriate to suit the particular needs of the control circuit 216. However, in another form, it is generally contemplated that the control circuit 216 may not be directly coupled to a network interface and network because instead the AGV 202 may be in communication with a command and control center 206 that may be coupled to a network interface and network.

The system 200 also includes a UAV 204, which serves as a back-up delivery apparatus. The UAV 204 includes various components in order to deliver merchandise from the AGV's location (when it is blocked by an obstacle) to the destination location. The UAV 204 includes a motorized flight system 218 configured to facilitate flight of the UAV 204. For example, the motorized flight system 218 may be in the form of propellers, a drive mechanism, a motor, landing gear, and a power source (such as a battery).

Further, the UAV 204 includes a gripper mechanism 220 for selectively grasping, holding, and releasing the merchandise item being delivered. It is generally contemplated that the gripper mechanism 220 may be any of various types, such as, for example, grabbing claws (that may include a cable attached to the UAV 204 and multiple talons), robotic gripping arms, clamps, magnets, etc. The gripper mechanism 220 is arranged so as to retrieve the merchandise item from the storage area 210, retain the merchandise item as the UAV 204 flies to the destination location, and drop off the merchandise item at the destination location.

In addition, the UAV 204 includes a transceiver 222 or other two-way communication device for wireless communication. It is generally contemplated that the UAV 204 will communicate with the AGV 202 and/or with the command and control center 206. For example, if the AGV 202 encounters an insurmountable obstacle, the UAV 204 may receive a communication either directly from the AGV 202 (or indirectly from AGV 202 via the command and control center 206) that instructs the UAV 204 to retrieve the merchandise item from the AGV 202 and complete the delivery. It is also contemplated that the UAV may communicate with the AGV 202 and/or the command and control center 206 at other times during delivery (such as upon completion of the delivery or upon possibly returning to the AGV 202 after the delivery). Further, the UAV 204 may include a GPS tracking device 223, such as for tracking of the location of the UAV 204 by the command and control center 206.

The UAV 204 also includes sensors(s) facilitating flight of the UAV 204 and delivery of merchandise items. It is generally contemplated that the UAV 204 may include conventional position and movement sensors (such as compasses, gyroscopes, accelerometers, etc.) that provide information to assist in navigation of the craft. The UAV 204 further includes an optical/imaging sensor 224 configured to capture a plurality of images. The optical/imaging sensor 224 may be any of various types of video/camera devices. It is contemplated that the imaging sensor 224 will capture images at various stages of the flight, such as during retrieval of a merchandise item being delivered from the AGV storage area 210, landing at the destination location, and possibly returning and landing on the AGV 202 following delivery. At these particular stages, it is contemplated that the UAV 204 may be in communication with a human operator at the command and control center 206, whose expert guidance may be required to navigate the UAV 204. At other times, the UAV 204 may operate and fly autonomously.

In addition, the UAV 204 includes a control circuit 226 that is operatively coupled to the motorized flight system 218, the gripper mechanism 220, the transceiver 222, and the optical sensor 224, and the UAV control circuit 226 is configured to operate and fly the UAV 204. Like the AGV control circuit 216, being a "circuit," the UAV control circuit 226 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 226 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 216 is configured (for example, by using corresponding programming as will be well understood by those skilled in the art) to carry out one or more of the steps, actions, and/or functions described herein.

It is generally contemplated that the control circuit 226 will autonomously navigate and operate the UAV 204 (but possibly with instruction from a remote command and control center 206 in certain circumstances). In one form, the control circuit 226 uses input from its sensor(s) 212 to determine its position (assuming it is mounted on the AGV 202) and may calculate and navigate a delivery route to the destination location. In another form, the command and control center 206 may transmit information to the UAV 204 information regarding the AGV location, the destination location, and the delivery route.

Like the AGV control circuit 216, the UAV control circuit 226 may be operably coupled to a memory that can serve, for example, to non-transitorily store the computer instructions that, when executed by the control circuit 226, cause the control circuit 226 to behave as described herein. In one form, the control circuit 226 may also operably couple to a network interface that can compatibly communicate via whatever network or networks may be appropriate to suit the particular needs of the control circuit 226. However, in another form, it is generally contemplated that the control circuit 226 may not be directly coupled to a network interface and network because instead the UAV 204 may be in communication with a command and control center 206 that may be coupled to a network interface and network.

Next, the system 200 optionally includes a command and control center 206 in communication with both the AGV 202 and UAV 204. In one form, it is contemplated that the system 200 need not include a remote command and control center 206, but instead, the system 200 is controlled and operated primarily by either the AGV control circuit 216 or the UAV control circuit 226. However, in the preferred form, the system does include the command and control center 206 that communicates with and controls the operation of the AGV 202 and UAV 204 in some circumstances (such as by a human operator). The command and control center 206 may include a communication interface 228. This interface 228 may include various conventional components for communicating with the AGV 202 and UAV 204 and facilitating remote operation of the AGV 202 and UAV 204, such as joysticks, virtual reality and augmented reality interfaces, voice commands, radio transmitters/receivers/transceivers, mobile computing devices, computer programs, etc.

As indicated, the command and control center 206 preferably controls the operation of the AGV 202 and UAV 204 in certain circumstances, which is performed via control circuit 230. More specifically, the control circuit 230 instructs movement of the AGV 202 along a delivery route from a starting location to a delivery location and determines if the AGV 202 has stopped based on the AGV's detection of an obstacle (such as via a communication from the AGV 202). Then, under certain established conditions or circumstances, the control circuit 230 instructs the UAV 204 to retrieve the merchandise item to be delivered from the AGV storage area 210 using the gripper mechanism 220, calculate a delivery route for the UAV 204 from the stopped AGV location to the delivery location, and instruct the UAV 204 to deliver the merchandise item from the AGV's stopped location to the delivery location.

Assuming the UAV 204 completes a delivery, the UAV 204 may either return to the AGV 202 or may be instructed to proceed to another designated location. In one form, the control circuit 230 may be configured to instruct the UAV 204 to return to the mounting area 215 on the AGV 202 following completion of the delivery by the UAV 204. In this form, it is assumed that the AGV 202 has a mounting area 215 and the UAV 204 is generally travelling along with the AGV 202. Further, the UAV 204 may use its optical sensor 224 when returning to and landing at the mounting area 215, and it is contemplated that a human operator at a command and control center 206 may assist or guide this landing at the mounting area 215.

It is also contemplated that alternative delivery routes for the AGV 202 may be calculated prior to action by the UAV 204. In other words, the AGV 202 may be re-routed when it encounters an obstacle. For example, the control circuit 230 may calculate an alternative delivery route to the delivery location from the AGV's stopped location if the AGV encounters an obstacle and the stop does not satisfy the predetermined condition. The control circuit 230 may then instruct the AGV 202 to move along the alternative delivery route to the delivery location to complete the delivery.

Any of various conditions or circumstances may be set to trigger action by the UAV 204. So, for example, the UAV 204 may complete the delivery if the AGV 202 cannot complete the delivery on time by taking an alternative route. In other words, the condition may be in the form of completing the delivery within an established delivery time. In one form, if the control circuit 230 is unable to calculate an alternative delivery route for the AGV 202 in which the delivery is completed within the established delivery time, the control circuit 230 may instruct the UAV 204 to complete the delivery.

As another example, the established condition or circumstance may be a maximum time that is established for the AGV 202 to wait for an obstacle. In other words, the condition may be in the form of a predetermined maximum wait time interval such that the UAV 204 is instructed to retrieve the merchandise item to be delivered if an obstacle causes the AGV 202 to be stopped for a length of time exceeding the predetermined maximum wait time interval. This condition may not require a calculation of alternative delivery routes.

More specifically, in this maximum wait time example, when sensors 212 on the AGV 202 detect an object blocking the route to complete the delivery, the AGV 202 may start a timer. Once the time on the timer for the blockage exceeds a threshold, the AGV 202 notifies the command and control center of the blockage. If the AGV 202 has a mounted UAV 204, the AGV 202 may communicate with the UAV through Bluetooth, internet hotspot, or radio to activate the UAV gripper device 220 to extract the package. In this example, the UAV 204 may activate a top up facing camera 224 to see if there are overhead obstructions. Assuming there are no overhead obstructions, the AGV 202 or the UAV 204 may transmit their location back to the command and control center 206. The command and control center 206 may then use the AGV/UAV location and the destination location to compute a new route for the UAV 204 to complete the delivery mission.

In this example, the command and control center 206 may then transmit the route to the UAV 204 for it to complete the mission. The UAV 204 may then grab and lift the package/merchandise to be delivered from the AGV 202 and launch itself to deliver the package. Once the destination is reached, the UAV 204 may communicate to the AGV 202 and the command and control center 206 that the delivery is complete. Further, the AGV 202 may communicate its location and the UAV 204 may communicate its location back to the command and control center 206 to calculate the route for the UAV 204 to land back on top of the AGV 202. Once the UAV 204 is within range of the AGV 202, the UAV cameras 224 may be used to position the UAV 204 above the AGV 202 for landing. Once the UAV 204 is landed, the AGV 202 may recharge the UAV 204 by connecting a charger on the AGV 202 to the UAV 204 battery charging strips in the UAV landing gear. If the AGV 202 has another package to deliver, the UAV 204 may assist in another package delivery.

As stated above, the control circuit 230 may be remotely located at a command and control center 206. In other words, in one form, the control circuit 230 may be physically located at a command and control center 206 remote from the AGV 202 and the UAV 204, and the control circuit 230 is in wireless communication with the AGV and UAV control circuits 216, 226. However, in another form, the control circuit 230 may define a unitary control circuit with either the AGV or UAV control circuits 216, 226 such that the control circuit 230 is physically incorporated into either the AGV 202 or UAV 204.

Assuming a separate control circuit 230 at the command and control center 206, the control circuit 230 is communicatively coupled to the AGV 202 and UAV 204. Like the AGV control circuit 216 and the UAV control circuit 226, being a "circuit," the control circuit 230 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 230 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 230 is configured (for example, by using corresponding programming as will be well understood by those skilled in the art) to carry out one or more of the steps, actions, and/or functions described herein.

By one optional approach, the control circuit 230 operably couples to a memory 232. This memory 232 may be integral to the control circuit 230 or can be physically discrete (in whole or in part) from the control circuit 230, as desired. This memory 232 can also be local with respect to the control circuit 230 (where, for example, both share a common circuit board, chassis, power supply, and/or housing) or can be partially or wholly remote with respect to the control circuit 230 (where, for example, the memory 232 is physically located in another facility, metropolitan area, or even country as compared to the control circuit 230).

This memory 232 can serve, for example, to non-transitorily store the computer instructions that, when executed by the control circuit 230, cause the control circuit 230 to behave as described herein. As used herein, this reference to "non-transitorily" will be understood to refer to a non-ephemeral state for the stored contents (and hence excludes when the stored contents merely constitute signals or waves), rather than volatility of the storage media itself, and hence includes both non-volatile memory (such as read-only memory (ROM)) as well as volatile memory (such as an erasable programmable read-only memory (EPROM).)

In this example, the control circuit 230 may also operably couple to a network interface 234. So configured, the control circuit 230 can communicate with other elements (both within the system 200 and external thereto) via the network interface 234. Network interfaces, including both wireless and non-wireless platforms, are well understood in the art and require no particular elaboration here. This network interface 234 can compatibly communicate via whatever network or networks 236 may be appropriate to suit the particular needs of a given application setting. Both communication networks and network interfaces are well understood areas of prior art endeavor and therefore no further elaboration will be provided here in those regards for the sake of brevity.

Figure 3:
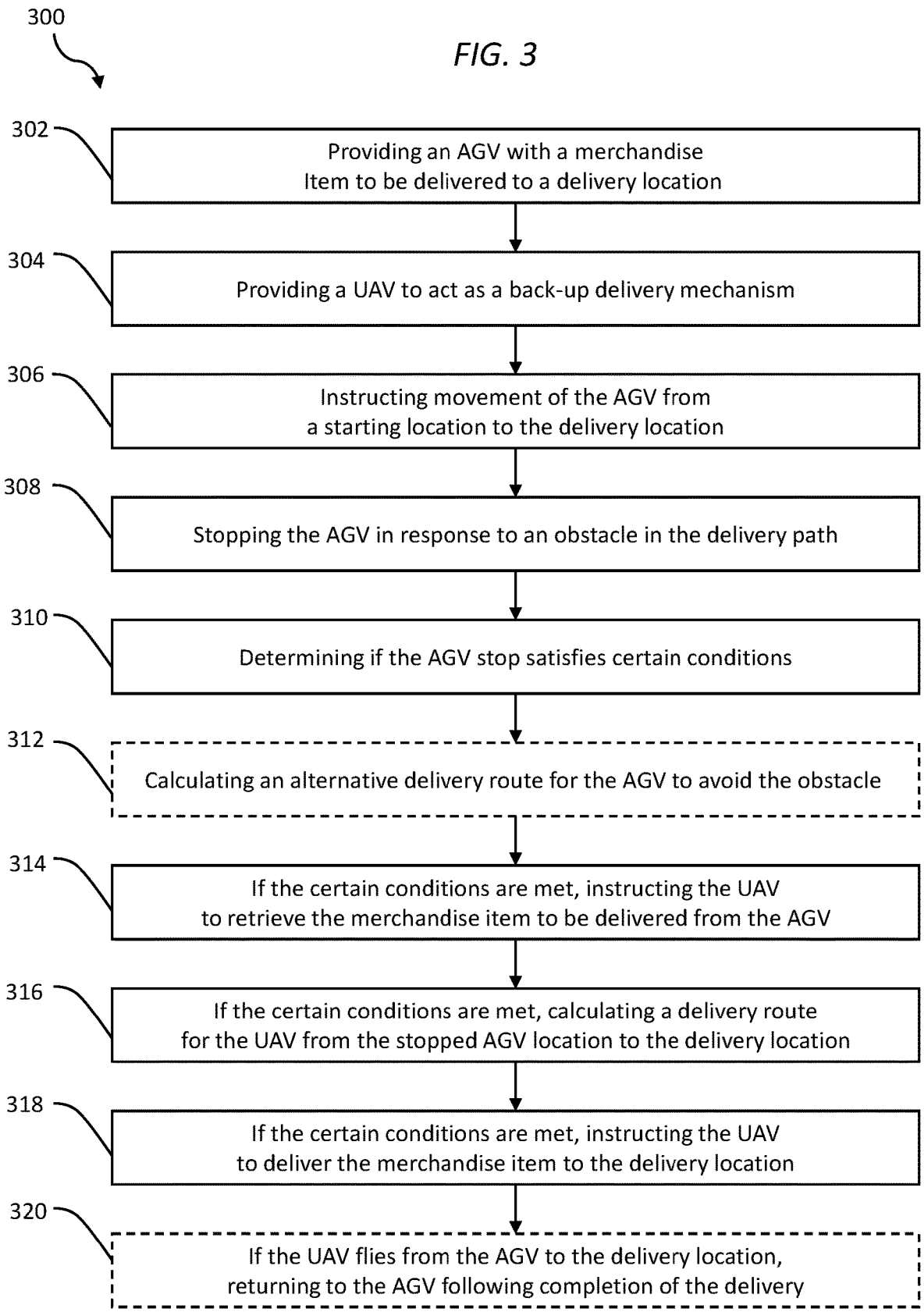
FIG. 3 is a flow diagram in accordance with some embodiments.

Referring to FIG. 3, there is shown a process 300 for delivering merchandise using a combination AGV-UAV delivery system. The process 300 uses an AGV as the primary delivery mechanism with the UAV serving as a back-up mechanism if the AGV encounters certain types of obstacles. The process 300 may use some or all of the components of the systems 100 and 200 described above.

At block 302, an AGV transporting the merchandise item is provided for delivery to a delivery location. It is generally contemplated that the AGV will include components needed for performing the delivery, including a motorized locomotion system, a storage area for holding the merchandise item, sensor(s) to detect obstacles in the delivery path, a transceiver for wireless communication, and a control circuit for moving and operating the AGV. These components may be those described above with respect to systems 100 and 200. The AGV is the primary delivery mechanism and will transport the merchandise item along the entire delivery route from the starting location to the delivery location, if practicable.

At block 304, a UAV is provided to act as a back-up delivery mechanism. It is also contemplated that the UAV will include components needed for performing the delivery, including a motorized flight system, a gripper mechanism for retrieving the merchandise item from the AGV, a transceiver for wireless communication, an optical/imaging sensor for capturing images, and a control circuit for operating and flying the UAV. These components may be those described above with respect to systems 100 and 200. In one form, it is contemplated that the UAV may be transported by the AGV, i.e., ride piggy-back along with the AGV. The UAV is the back-up delivery mechanism if the AGV encounters a certain type of obstacle and will transport the merchandise item from the stopped AGV to the delivery location.

At block 306, the AGV is instructed to move along a delivery route from a starting location to a delivery (or destination) location. In one form, it is contemplated that the AGV may be programmed to deliver (or may calculate a delivery route) to a waypoint near the final merchandise drop-off location. In this form, the process 300 contemplates the possible involvement of a human operator at a remote command and control center. The AGV may be instructed to travel autonomously to the waypoint, and the human operator may navigate the AGV to the final drop-off location. This involvement by a human operator may be desirable to make sure the AGV is expertly and accurately guided to the drop-off location.

At block 308, the AGV stops in response to an obstacle in its delivery path. The AGV may encounter numerous obstacles along its delivery path (such as, for example, motor vehicles, people, animals, traffic, road and sidewalk obstacles, etc.). Some of these obstacles may be temporary in nature and may incur relatively minor delay by the AGV. However, some of these obstacles may be of a more permanent nature (such as a closed gate or a block road) or may incur a significant delay (such as a freight train or raised bridge).

At block 310, it is determined if the AGV stop satisfies certain conditions. As a first example, the condition may involve a predetermined maximum wait time interval. In this example, once the AGV's actual measured wait time exceeds this threshold, the condition is satisfied, and the UAV will be contacted to complete this delivery. This threshold may be based on a single wait time or based on cumulative wait times for multiple obstacles encountered during the delivery. For example, the predetermined maximum wait time interval may be one hour (which may constitute the maximum amount of delay allowed in order to satisfy a delivery schedule), and this one hour period may be exceeded based on the cumulative amount of delay (such as three separate stops of 15 minute, 20 minutes, and 25 minutes wait time). Alternatively, the condition may apply the threshold to each individual stop such that one stop exceeding the one hour wait time is required before the condition is satisfied.

Another example of a condition involves calculating an alternative route about an obstacle and comparing the new estimated delivery time with a scheduled delivery time. In this example, when the AGV encounters an obstacle, it calculates alternative routes to the delivery location, as well as an estimated delivery time for each alternative route. It then compares the estimated delivery times for alternative routes with a threshold delivery time (such as the latest scheduled time the delivery can be made). In this example, once all of the estimated delivery times exceed the threshold delivery time, the condition is satisfied, and the UAV will be contacted to complete this delivery.

In another example, the condition may involve the length of time estimated for the UAV to complete the delivery. This condition may involve a minimum time threshold for completion of the delivery. If the AGV has not completed the delivery by a certain time (such as the latest scheduled delivery time minus the minimum time threshold), the condition is satisfied, and the UAV will be contacted to complete this delivery.

Further, as another example, the UAV may be limited in the distance it can travel, such as based on limits arising from its battery. In other words, the UAV may not be able to fly long distances, especially with heavy objects, because its battery will not be able to provide sufficient power. Accordingly, a maximum UAV flight distance may be incorporated into the conditions/algorithms/requirements. If the AGV cannot complete the delivery and the remaining distance to the waypoint or delivery location exceeds the maximum flight distance, the delivery mission may be aborted entirely.

As should be evident, numerous types of conditions can be established to trigger when the UAV will take over and complete the delivery. These conditions may involve such factors and inputs as scheduled delivery times, amount of delay caused by obstacle(s), estimated travel time of the AGV along alternative routes, and estimated flight time of the UAV from the AGV's current position to the delivery location. Further, in other algorithms, the conditions may involve other considerations, such as the remaining battery power of the AGV and/or the UAV (e.g., a low threshold AGV battery power may trigger the condition), real time traffic conditions (e.g., heavy traffic may affect calculation of alternative routes), weight of the merchandise (e.g., certain heavy merchandise may exceed a maximum UAV carrying capacity), and scheduled delivery times for subsequent deliveries (e.g., it may be desirable to have the UAV complete an earlier delivery in order to have sufficient time to complete later deliveries on time).

At block 312, alternative delivery route(s) may be calculated for the AGV to avoid an obstacle. As addressed above, calculating whether alternative routes for the AGV are available (and estimated delivery times for those alternative routes) may be part of determining whether the condition(s) are satisfied. It is generally contemplated that any of various types of vehicle traffic navigation and mapping software may be used. This software may select routes for the AGV based on real time traffic conditions and route information. Further, it is contemplated that these alternative routes and estimated arrival times may be calculated by either an AGV control circuit or by a control circuit at a command and control center.

At block 314, if the certain conditions are met, the UAV is instructed to retrieve the merchandise item to be delivered from the AGV. In one form, as described above, the UAV may be mounted on and transported with the AGV. In another form, the UAV may be at a remote location such as at a command and control center and may fly to the AGV to retrieve the merchandise item. In either form, it is generally contemplated that the UAV will employ some gripper mechanism to retrieve the merchandise item. At this stage, it may be desirable to have a human operator guide and control the UAV and operate the gripper mechanism to retrieve the merchandise item.

At block 316, if the certain conditions are met, a delivery route is calculated for the UAV from the location of the stopped AGV to the delivery location. In one form, it is contemplated that a control circuit (AGV, UAV, or command and control center) may calculate a flight path from the stopped AGV location to a waypoint near the final drop-off location. Any of various types of flight navigation software may be used, and this software may select routes for the UAV based on weather and other flight conditions.

At block 318, if the certain conditions are met, the UAV is instructed to deliver the merchandise item to the delivery location by flying along the flight path. In one form, the UAV may fly autonomously to the waypoint, but it may be desirable to have a human operator at the command and control center take over and land the UAV after it arrives at the waypoint. The human operator may be able to more accurately guide the UAV to the final drop-off location using the UAV's optical/imaging sensor(s).

At block 320, once the UAV flies from the stopped AGV to the delivery location, the UAV may then return to the AGV following completion of the delivery. This optional step assumes that the AGV has been transporting the UAV. In this case, once the UAV returns to the AGV, the AGV may then complete subsequent deliveries (assuming it is carrying other merchandise items for delivery) or may return to a home base location (where it may pick up other merchandise items for delivery). The UAV may again be used if the AGV encounters obstacles while making subsequent deliveries.

Figure 4:
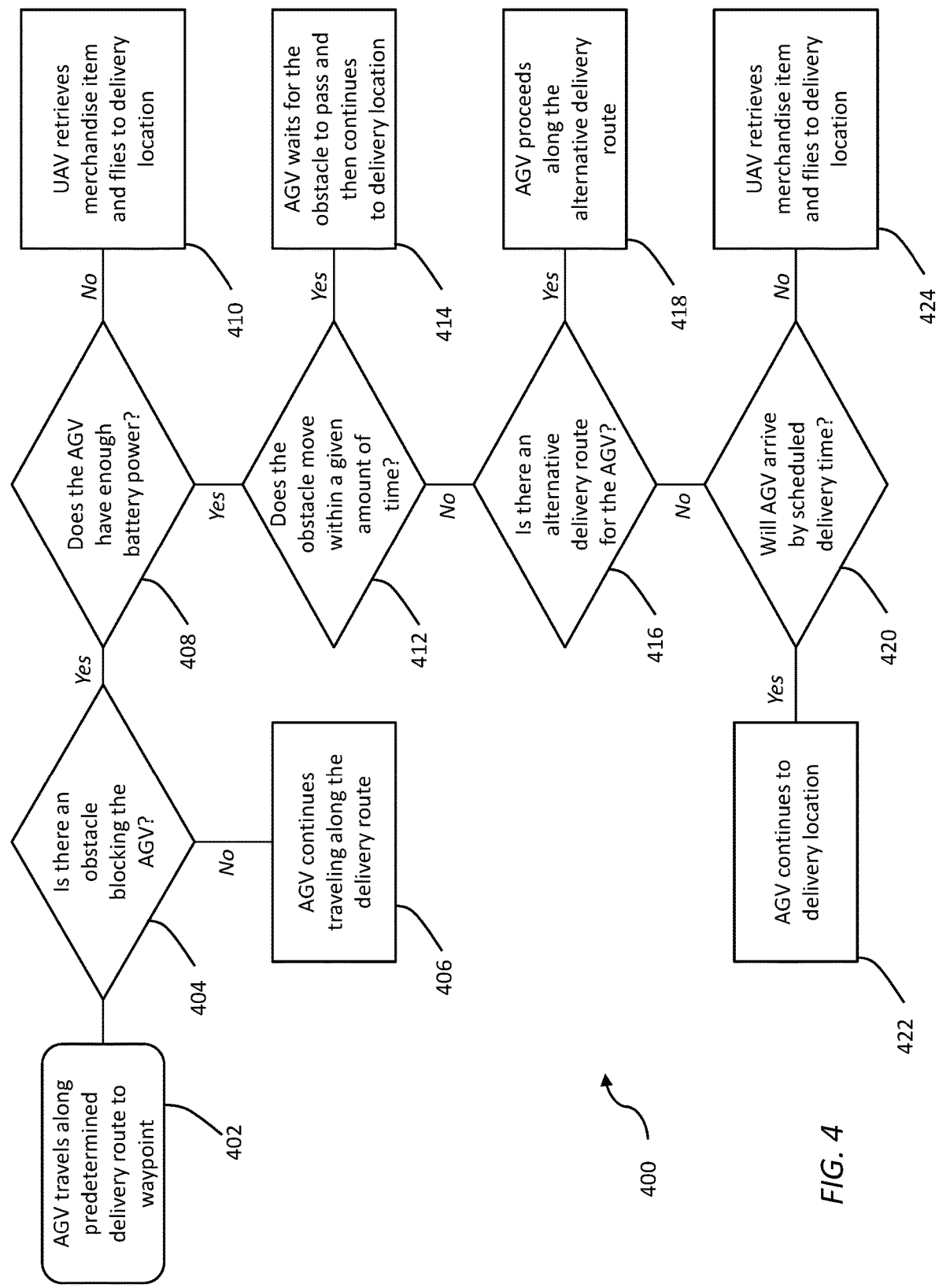
FIG. 4 is a flow diagram in accordance with some embodiments.

Referring to FIG. 4, there is shown a process 400 for delivering merchandise using a combination AGV-UAV delivery system. The process 400 uses a combination AGV-UAV delivery approach and shows an algorithm with specific decisions made during the process 400. The process 400 may use some or all of the components of the systems 100 and 200 described above.

The process 400 generally contemplates the use of a UAV and an AGV with components as described above. In this example, the UAV is mounted on the AGV and travels with the AGV during deliveries. Further, the AGV receives initial instructions to proceed autonomously to a predetermined waypoint near the final delivery location, and a delivery route to the waypoint has been calculated. It is contemplated that when the AGV reaches the waypoint, it will then communicate with a remote command and control center, and a human operator will then navigate the AGV to the final delivery location.

At block 402, the AGV travels along the delivery route to the waypoint. As described above, the AGV includes any of various obstacle detection sensors that enable it to determine obstacles that may lie in its travel path. At block 404, the AGV continually monitors to detect if an obstacle is blocking the AGV. At block 406, if the AGV does not encounter any obstacles, it will continue to travel along the delivery route. If the AGV does not encounter any obstacles, it could arrive at the waypoint where the human operator can guide the AGV to complete the delivery.

At block 408, the AGV has detected an obstacle blocking the AGV. At this point, it is contemplated that there will be a check to determine whether the AGV has enough battery power to complete the delivery and to travel to an appropriate rendezvous location (which may be the starting location). It is generally contemplated that the battery power will be periodically or continually monitored to avoid having the AGV become stranded at some inconvenient location where it may have to be retrieved later. At block 408, while the AGV is detained by an obstacle and possibly waiting for the obstacle to move out of the way, the battery power will be checked to make sure that this wait will not cause it to become stranded. This check may be performed at the AGV or at the command and control center, and a predetermined minimum threshold may be used (such as, for example, 50% remaining battery power).

At block 410, it is detected that the battery power level has reached a certain minimum threshold, i.e., there is insufficient battery power remaining. At this point, it is determined that the AGV will not complete the delivery and that the back-up delivery mechanism (the UAV) will complete the delivery. It is generally contemplated that a human operator may operate the UAV to retrieve the merchandise item. The UAV may then fly autonomously to the predetermined waypoint near the delivery location. At that time, the human operator may take over and navigate the UAV to the delivery location where the UAV may release the merchandise item. It is contemplated that the UAV will then fly back to the AGV where the human operator may guide it to the mounting area of the AGV.

At block 412, the detected battery power level is sufficient for the AGV to complete the delivery and then proceed to the starting/rendezvous location. At this stage, the AGV waits for a certain minimum amount of time (such as five minutes) for the obstacle to pass. It is generally contemplated that many obstacles may be temporary in nature (such as traffic, moving cars or people, etc.) so that a short wait may be sufficient. At block 414, the AGV detects that the obstacle has moved out of the way within this minimum amount of time. The AGV may then continue along the delivery route to complete the delivery.

At block 416, the obstacle has not moved out of the way within the minimum amount of time. For example, the AGV has been waiting for more than five minutes. The AGV may have encountered a more permanent sort of obstacle, such as a closed gate. At this time, alternative delivery routes to the waypoint may be calculated, including calculation of the estimated travel time along any alternative delivery routes. If an alternative delivery route exists and the estimated travel time allows the AGV to arrive at the delivery location by the scheduled delivery time, the AGV will then take the alternative delivery route with the shortest travel time. At block 418, an alternative delivery route exists satisfying these requirements, and the AGV proceeds along the alternative delivery route to complete the delivery.

At block 420, an alternative delivery route does not exist that satisfies the above requirements. The AGV will continue to wait for the obstacle to pass or move out of the way. The estimated travel time of the AGV to the delivery location relative to the scheduled delivery time is monitored. As long as the estimated travel time allows the AGV to complete the delivery within the scheduled delivery time, the AGV will continue to wait for the obstacle to move out of the way. At block 422, assuming the obstacle moves out of the way, the AGV continues to the delivery location.

However, at block 424, once the estimated travel time no longer allows the AGV to complete the delivery by the scheduled delivery time, it is determined that the AGV will not complete the delivery. Instead, the UAV will complete the delivery. Again, it is generally contemplated that a human operator may operate the UAV to retrieve the merchandise item, the UAV may fly autonomously to the waypoint, a human operator may land the UAV at the delivery location, and the UAV may then fly back to the AGV.

It is generally contemplated that the steps and decisions of process 400 are repeated as the AGV encounters new obstacles. For example, a determination of battery power is made, at least, every time the AGV encounters an obstacle (and is monitored periodically as the AGV is waiting for the obstacle to pass). Also, the minimum wait time will restart every time the AGV encounters another obstacle. Further, the AGV may encounter obstacles along alternative delivery routes, and these steps and decisions will be repeated for obstacles encountered along alternative delivery paths.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for delivery of merchandise, the system comprising:
    an autonomous ground vehicle (AGV) comprising:
        a motorized locomotion system configured to facilitate movement of the AGV;
        at least one sensor configured to detect obstacles in a direction of travel of the AGV;
        a first transceiver configured for wireless communication;
        a first control circuit operatively coupled to the motorized locomotion system, the at least one sensor, and the first transceiver, the first control circuit configured to operate and move the AGV;
    an unmanned aerial vehicle (UAV) comprising:
        a motorized flight system configured to facilitate flight of the UAV;
        a second transceiver configured for wireless communication;
        a second control circuit operatively coupled to the motorized flight system and the second transceiver, the second control circuit configured to operate and fly the UAV;
    a third control circuit configured to:
        determine that the AGV has stopped at a stopped location based on the detection of an obstacle by the at least one sensor while attempting to deliver a merchandise item to a delivery location; and
        instruct the UAV to deliver the merchandise item from the stopped location to the delivery location.

2. The system of claim 1 wherein the third control circuit is configured to:
    instruct the UAV to deliver the merchandise item from the stopped location to the delivery location after the AGV has been stopped at the stopped location for a predetermined maximum wait time interval.

3. The system of claim 1 wherein the third control circuit is configured to:
    calculate whether an alternative delivery route for the AGV to the delivery location from the AGV's stopped location around the obstacle is available; and
    instruct the UAV to deliver the merchandise item from the stopped location to the delivery location when an alternative delivery route for the AGV is not available.

4. The system of claim 1 wherein the third control circuit is configured to:
    determine a length of time required for the UAV to fly from the stopped location to the delivery location to calculate an estimated time of arrival for the UAV; and
    instruct the UAV to deliver the merchandise item from the stopped location to the delivery location when the estimated time of arrival for the UAV is equivalent to a scheduled delivery time.

5. The system of claim 1 wherein the third control circuit is configured to:
    calculate whether the AGV has sufficient battery power to travel from the stopped location to the delivery location and from the delivery location to a third location; and
    instruct the UAV to deliver the merchandise item from the stopped location to the delivery location when the AGV does not have sufficient battery power.

6. The system of claim 1 further comprising a mounting area on the AGV configured to support a UAV on the AGV and to secure it to the AGV during movement of the AGV.

7. The system of claim 6 wherein the third control circuit is configured to instruct the UAV to return to the mounting area on the AGV following completion of delivery by the UAV.

8. The system of claim 1 wherein the third control circuit is physically located at a command and control center remote from the AGV and the UAV, the third control circuit in wireless communication with the first and second control circuits.

9. The system of claim 1 wherein the third control circuit defines a unitary control circuit with either the first or second control circuits such that the third control circuit is physically incorporated into either the AGV or UAV.

10. The system of claim 1 wherein the UAV further comprises a gripper mechanism configured to selectively grasp, hold, and release a merchandise item.

11. The system of claim 1 wherein:
    the UAV further comprises an optical sensor configured to capture a plurality of images; and
    the UAV is configured to deliver the merchandise item to the delivery location using the optical sensor to capture images of the delivery location.

12. A method for delivery of merchandise comprising:
    providing an autonomous ground vehicle (AGV) comprising:
        a motorized locomotion system configured to facilitate movement of the AGV;
        at least one sensor configured to detect obstacles in a direction of travel of the AGV;
        a first transceiver configured for wireless communication;
        a first control circuit operatively coupled to the motorized locomotion system, the at least one sensor, and the first transceiver, the first control circuit configured to operate and move the AGV;
    providing an unmanned aerial vehicle (UAV) comprising:
        a motorized flight system configured to facilitate flight of the UAV;
        a second transceiver configured for wireless communication;
        a second control circuit operatively coupled to the motorized flight system and the second transceiver, the second control circuit configured to operate and fly the UAV;
    by a third control circuit:
        determining that the AGV has stopped at a stopped location based on the detection of an obstacle by the at least one sensor while attempting to deliver a merchandise item to a delivery location; and
        instructing the UAV to deliver the merchandise item from the stopped location to the delivery location.

13. The method of claim 12 further comprising, by the third control circuit:
    instructing the UAV to deliver the merchandise item from the stopped location to the delivery location after the AGV has been stopped at the stopped location for a predetermined maximum wait time interval.

14. The method of claim 12 further comprising, by the third control circuit:
    calculating whether an alternative delivery route for the AGV to the delivery location from the AGV's stopped location around the obstacle is available; and
    instructing the UAV to deliver the merchandise item from the stopped location to the delivery location when an alternative delivery route for the AGV is not available.

15. The method of claim 12 further comprising, by the third control circuit:
- determining a length of time required for the UAV to fly from the stopped location to the delivery location to calculate an estimated time of arrival for the UAV; and
- instructing the UAV to deliver the merchandise item from the stopped location to the delivery location when the estimated time of arrival for the UAV is equivalent to a scheduled delivery time.

16. The method of claim 12 further comprising, by the third control circuit:
- calculating whether the AGV has sufficient battery power to travel from the stopped location to the delivery location and from the delivery location to a third location; and
- instructing the UAV to deliver the merchandise item from the stopped location to the delivery location when the AGV does not have sufficient battery power.

17. The method of claim 12 further comprising mounting the UAV on the AGV and securing the UAV to the AGV during movement of the AGV to the delivery location.

18. The method of claim 17 further comprising, by the UAV, returning to the AGV following completion of delivery by the UAV.

19. The method of claim 12 further comprising, by the UAV, selectively grasping, holding, and releasing a merchandise item.

20. The method of claim 12 further comprising, by the UAV, delivering the merchandise item to the delivery location using an optical sensor to capture images of the delivery location.

* * * * *